United States Patent
Ishihara

(10) Patent No.: US 8,132,425 B2
(45) Date of Patent: *Mar. 13, 2012

(54) ELECTRICAL COMPONENT BOX OF CONTAINER REFRIGERATION SYSTEM

(75) Inventor: Hiroki Ishihara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 713 days.

This patent is subject to a terminal disclaimer.

(21) Appl. No.: 12/085,950

(22) PCT Filed: Dec. 8, 2006

(86) PCT No.: PCT/JP2006/324556
§ 371 (c)(1),
(2), (4) Date: Jun. 3, 2008

(87) PCT Pub. No.: WO2007/069546
PCT Pub. Date: Jun. 21, 2007

(65) Prior Publication Data
US 2009/0151379 A1    Jun. 18, 2009

(30) Foreign Application Priority Data

Dec. 16, 2005  (JP) ................................. 2005-362969

(51) Int. Cl.
*F25D 3/08* (2006.01)
(52) U.S. Cl. .......................................... 62/371; 62/440
(58) Field of Classification Search .................... 62/371, 62/440, 259.1, 259.2; 312/223.1, 401; 220/4.02, 220/4.09
See application file for complete search history.

(56) References Cited

U.S. PATENT DOCUMENTS

| | | | | |
|---|---|---|---|---|
| 3,870,873 A | * | 3/1975 | Mallory | 362/2 |
| 4,914,341 A | * | 4/1990 | Weaver et al. | 312/407 |
| 4,944,157 A | * | 7/1990 | Jenkins et al. | 62/407 |
| 4,963,099 A | * | 10/1990 | Sato et al. | 439/76.2 |
| 5,187,950 A | * | 2/1993 | Weldon | 62/449 |
| 5,224,508 A | * | 7/1993 | Bates, Jr. | 137/312 |
| 5,346,299 A | * | 9/1994 | Werkmeister et al. | 312/405.1 |
| 5,378,174 A | * | 1/1995 | Brownlie et al. | 439/709 |
| 5,730,617 A | * | 3/1998 | Araki et al. | 439/374 |
| 7,176,377 B1 | * | 2/2007 | Gretz | 174/58 |
| 7,347,329 B2 | * | 3/2008 | Burns et al. | 206/711 |

(Continued)

FOREIGN PATENT DOCUMENTS

CN   1229034 A   9/1999

(Continued)

OTHER PUBLICATIONS

Translation of JP 2002-286360 to Hachisuga Katsumi.*

*Primary Examiner* — Mohammad Ali

(74) *Attorney, Agent, or Firm* — Birch, Stewart, Kolasch & Birch, LLP

(57) ABSTRACT

A pair of reinforcing ribs (50, 50) are formed on the bottom plate (33) of a box body (31) of an electrical component box (30). The reinforcing ribs (50, 50) have their respective pivot guides (50a, 50a) provided at their front ends to engage with associated pins (38b, 38b) on the safety cover (38). The safety cover (38) is pivotally supported to the pivot guides (50a, 50a) of the reinforcing ribs (50, 50) to allow it to open and close the opening of the box body (31).

14 Claims, 5 Drawing Sheets

U.S. PATENT DOCUMENTS

| | | | |
|---|---|---|---|
| 2002/0125247 A1* | 9/2002 | Kruer | 220/3.5 |
| 2002/0139555 A1* | 10/2002 | Dodds et al. | 174/50 |
| 2004/0065466 A1* | 4/2004 | Compagnone, Jr. | 174/66 |

FOREIGN PATENT DOCUMENTS

| | | |
|---|---|---|
| JP | 63-048106 A | 2/1988 |
| JP | 6-105417 A | 4/1994 |
| JP | 7-193918 A | 7/1995 |
| JP | 7-212927 A | 8/1995 |
| JP | 2002-286360 A | 10/2002 |
| JP | 2004-325022 A | 11/2004 |
| JP | 2004-353912 A | 12/2004 |

* cited by examiner

US 8,132,425 B2

ELECTRICAL COMPONENT BOX OF CONTAINER REFRIGERATION SYSTEM

TECHNICAL FIELD

This invention relates to structures of electrical component boxes used in container refrigeration systems for cooling the interiors of containers.

BACKGROUND ART

Container refrigeration systems are conventionally used for cooling the interiors of containers for use in sea transport or other transports.

For example, Patent Documents 1 and 2 disclose container refrigeration systems of this kind. As shown in FIGS. 6 and 7, a container refrigeration system (70) is assembled to the front opening of a container (C). A frame (71) of the container refrigeration system (70) has an exterior storage space (S1) formed in a lower part thereof to open onto the outside. Placed in the exterior storage space (S1) are a compressor (72), a condenser (73) and an external fan (74). The frame (71) has also an interior storage space (S2) formed in an upper part thereof to open onto the interior of the container (C). Placed in the interior storage space (S2) are an evaporator (75) and an internal fan (76). In the container refrigeration system (70), the compressor (72), the condenser (73), the evaporator (75) and other components are connected through refrigerant pipes to form a refrigerant circuit. In the container refrigeration system (70), the refrigerant circuit operates in a refrigeration cycle by circulating refrigerant therethrough, whereby the evaporator (75) cools the interior of the container (C).

The frame (71) of a container refrigeration system (70) of this kind further includes an electrical component box (80) mounted in a side face (the front face) thereof. The electrical component box (80) is formed in the shape of a box having an opening in the front and stores heavy electrical components, such as a breaker, a transformer and magnet switches, and light electrical components, such as control boards. The opening of the electrical component box (80) is covered with an outside lid (81). The outside lid (81) is provided with an operating part (81a) through which the user conducts operation mode change and other controls of the container refrigeration system (70).

Such an electrical component box (80) is disposed above the compressor (21) in the frame (71) because of space limitations imposed by installation spaces for the compressor (72) and other components. Therefore, the frame (71) includes support plates for supporting the bottom plate and the top plate of the electrical component box (80). The electrical component box (80) is fastened to the support plates by bolts and nuts.

A safety cover is attached to the opening of an electrical component box (80) of this kind inwardly of the outside lid (81). The safety cover has an opening formed to expose only the breaker in the electrical component box (80) to the outside. The other electrical components are covered with the safety cover. In other words, the safety cover prevents the user from touching the electrical components other than the breaker in turning on/off the breaker switch. Also attached to the electrical component box (80) are hinges or like fittings to allow the safety cover to open and close the opening. Thus, the electrical component box (80) is configured to allow the safety cover to be opened only in doing maintenance on the electrical components.

Patent Document 1: Published Japanese Patent Application No. 2004-353912

Patent Document 2: Published Japanese Patent Application No. 2004-325022

DISCLOSURE OF THE INVENTION

Problems to be Solved by the Invention

Because of a characteristic of container refrigeration systems that are used at sea, electrical component boxes as described above must be made from a high corrosion resistant material in order to be prevented from being rusted by salt water. However, in view of material cost saving, it is desirable that the electrical component box is reduced in thickness as much as possible. In addition, if the electrical component box is thus reduced in thickness, the stress on support members for supporting the electrical component box, such as support plates, is also reduced, which simplifies these support members.

On the other hand, if the electrical component box is thus reduced in thickness, its durability deteriorates. Particularly in the bottom plate of the electrical component box, a portion supported by the support plate of the frame is put under a large load. Therefore, reduction in thickness of the electrical component box makes the portion of the bottom plate more likely to break. To eliminate this problem, it can be considered that reinforcing members, such as reinforcing ribs, are mounted on the bottom plate of the electrical component box. In this case, however, the number of parts of the electrical component box increases.

The present invention has been made in view of the foregoing points and, therefore, an object thereof is to reinforce the bottom plate of an electrical component box of a container refrigeration system without increasing the number of parts.

Means to Solve the Problems

A first aspect of the invention is directed to an electrical component box of a container refrigeration system for cooling the interior of an container (C), wherein the electrical component box includes: a box body (30) formed in the shape of a box having an opening in one face and supported, with the opening oriented sideways, to a frame (20) of the container refrigeration system; and a safety cover (38) for opening and closing the opening of the box body (30), the box body (30) has a reinforcing rib (50) integrally formed on the top face of the bottom plate (33) thereof, and the reinforcing rib (50) has a holder (51) formed to hold the safety cover (38).

In the first aspect of the invention, the box body (31) for storing electrical components therein is mounted so that it is supported to the frame (20). If, in this state, the box body (31) is supported by the frame (20), most of the weights of the box body (31) and the electrical components contained in the box body (31) is placed on the supporting portion of the bottom plate (33). To cope with this, in this aspect of the invention, the reinforcing rib (50) is integrally formed on the bottom plate (33) to prevent the supporting portion of the bottom plate (33) from being broken.

Furthermore, the opening of the box body (31) is provided with a safety cover (38) for opening and closing the opening. When the opening of the box body (31) is closed with the safety cover (38), the safety cover (38) covers the electrical components. Therefore, the electrical components are not exposed to the user, which surely avoids that the user touches the energized electrical components. On the other hand, in making an exchange of or repairs to any of the electrical components, the safety cover (38) is opened to expose the electrical components to the user.

Furthermore, in this aspect of the invention, the reinforcing rib (50) has a holder (51) formed to hold the safety cover (38). The holder (51) holds the safety cover (38) at the opening of the box body (31) to ensure that the electrical components are covered with the safety cover (38).

A second aspect of the invention is the electrical component box of the container refrigeration system according to the first aspect of the invention, wherein the box body (31) is made from a resin material.

In the second aspect of the invention, since the box body (31) is made from a resin material, the box body (31) can be prevented from being rusted by seawater and can be reduced in weight.

Meanwhile, when the box body (31) is made from a resin material, it is difficult to ensure the strength of the box body (31) as compared to the box body made from stainless steel. In this aspect of the invention, however, since the reinforcing rib (50) is formed on the bottom plate (33) of the box body (31), this prevents the supporting portion of the bottom plate (33) from being broken.

A third aspect of the invention is the electrical component box of the container refrigeration system according to the first or second aspect of the invention, wherein the interior of the box body (31) is divided into a heavy electrical component storage space (S3) for storing heavy electrical components and an light electrical component storage space (S4) for storing light electrical components, and the safety cover (38) and the reinforcing rib (50) are provided in the heavy electrical component storage space (S3).

In the third aspect of the invention, the interior of the box body (31) is divided into a heavy electrical component storage space (S3) and a light electrical component storage space (S4). Stored in the heavy electrical component storage space (S3) are heavy electrical components, such as a breaker, a transformer and magnet switches. On the other hand, stored in the light electrical component storage space (S4) are light electrical components, such as control boards.

Heavy electrical components have large weights as compared to light electrical components. Therefore, a large load is placed particularly on part of the bottom plate (33) located in the heavy electrical component storage space (S3). To cope with this, in this aspect of the invention, the reinforcing rib (50) is provided in the heavy electrical component storage space (S3). Thus, the particularly breakable part of the bottom plate (33) can be effectively reinforced by the reinforcing rib (50).

Furthermore, heavy electrical components have higher service voltages than light electrical components. The heavy electrical components in service would be dangerous especially in case of exposure to the user. To cope with this, in this aspect of the invention, the safety cover (38) is provided in the heavy electrical component storage space (S3). Therefore, the heavy electrical components can be surely prevented from being exposed to the user and the area of the safety cover (38) can be reduced to the minimum necessary.

A fourth aspect of the invention is the electrical component box of the container refrigeration system according to any one of the first to third aspects of the invention, wherein a pair of said reinforcing ribs (50, 50) are formed in parallel to each other on the bottom plate (33) of the box body (30), and the holder comprises a pivot guide (50a, 50a) pivotally supporting the safety cover (38).

In the fourth aspect of the invention, a pair of reinforcing ribs (50, 50) are formed on the box body (30). Therefore, the strength of the bottom plate (33) of the box body (30) further increases. Furthermore, in this aspect of the invention, the pair of reinforcing ribs (50, 50) have their respective pivot guides (50a, 50a) formed as the holders. The safety cover (38) is pivotally supported to the pivot guides (50a, 50a) of the pair of reinforcing ribs (50, 50). Therefore, the box body (30) can be opened and closed by turning the safety cover (38).

Effects of the Invention

According to the present invention, since the reinforcing rib (50) is formed on the bottom plate (33) of the box body (31), the bottom plate (33) can be reinforced. This surely prevents the box body (31) from being broken and reduces the thickness of the box body (31) and in turn reduces the weight of the box body (31). Therefore, the box body (31) can be reduced in cost and, in turn, the frame (20) supporting the box body (31) can be simplified.

In the present invention, the reinforcing rib (50) has a holder (51) formed to hold the safety cover (38). Therefore, although in conventional electrical component boxes a member for holding the safety cover needs to be provided separately, the electrical component box according to the present invention does not need such a member. Hence, according to the present invention, the bottom plate (33) of the box body (31) can be reinforced without increasing the number of parts, thereby providing an electrical component box having a simple structure.

Particularly according to the second aspect of the invention, since the box body (31) is made from a resin material, the box body (31) can be further reduced in weight. Since the reinforcing rib (50) is formed on the bottom plate (33) while the box body (31) is made from a resin material, the bottom plate (33) can be prevented from being broken. Furthermore, when the box body (31) of the container refrigeration system (10) for use in sea transport is made from a resin material, the box body (31) can be effectively prevented from being rusted by salt water. Therefore, the box body (31) can be enhanced in durability. In addition, since the material of the box body (31) is a resin material, the reinforcing rib (50) on the bottom plate (33) can be easily molded.

Furthermore, in the third aspect of the invention, the reinforcing rib (50) and the safety cover (38) are disposed only in the heavy electrical component storage space (S3). Therefore, the reinforcing rib (50) and the safety cover (38) can be saved in size, thereby reducing the cost of the electrical component box. Although in respect of the bottom plate (33) of the box body (31) its part in the heavy electrical component storage space (S3) is put under a large load, the reinforcing rib (50) formed on that part effectively prevents the box body (31) from being broken. Furthermore, since the heavy electrical components that would be dangerous especially in case of the user touching them are covered with the safety cover (38), the safety of the user can be sufficiently ensured.

According to the fourth aspect of the invention, since the pivot guides (50a, 50a) of the pair of reinforcing ribs (50, 50) allow the safety cover (38) to turn thereabout, the user can easily open and close the safety cover (38).

Figure 1:
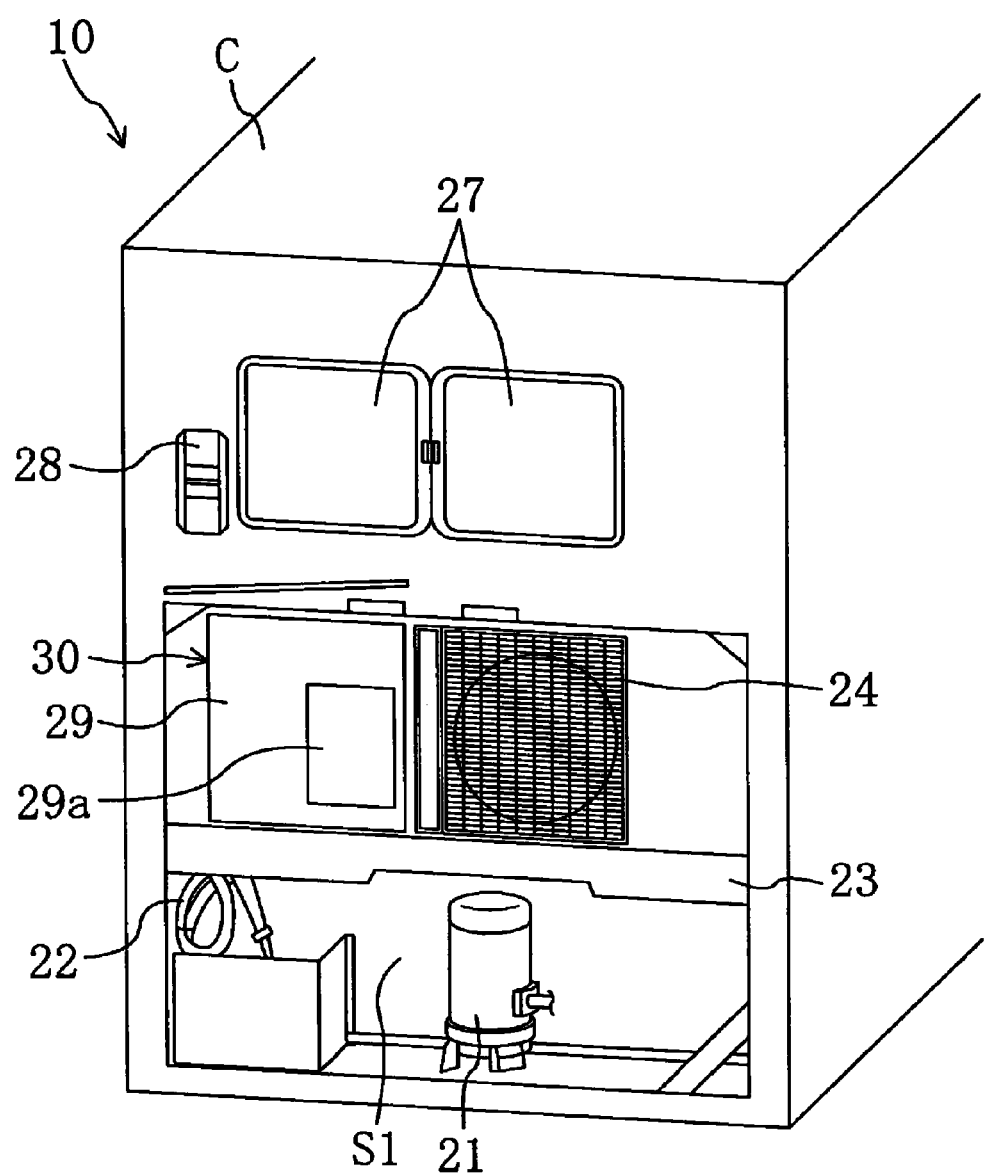
FIG. 1 is a schematic perspective view of a container refrigeration system according to an embodiment of the present invention as viewed from the front.

LIST OF REFERENCE CHARACTERS 10 container refrigeration system
20 frame
30 electrical component box
31 box body
33 bottom plate
38 safety cover
50 reinforcing rib
50a pivot guide (holder)
S3 heavy electrical component storage space
S4 light electrical component storage space

BEST MODE FOR CARRYING OUT THE INVENTION

Embodiments of the present invention will be described below in detail with reference to the drawings.

An electrical component box according to an embodiment of the invention is mounted in a container refrigeration system for use in sea transport or other transports. The container refrigeration system operates in a refrigeration cycle by circulating refrigerant through a refrigerant circuit and thereby cools the interior of a container.

<General Structure of Container Refrigeration System>

Figure 2:
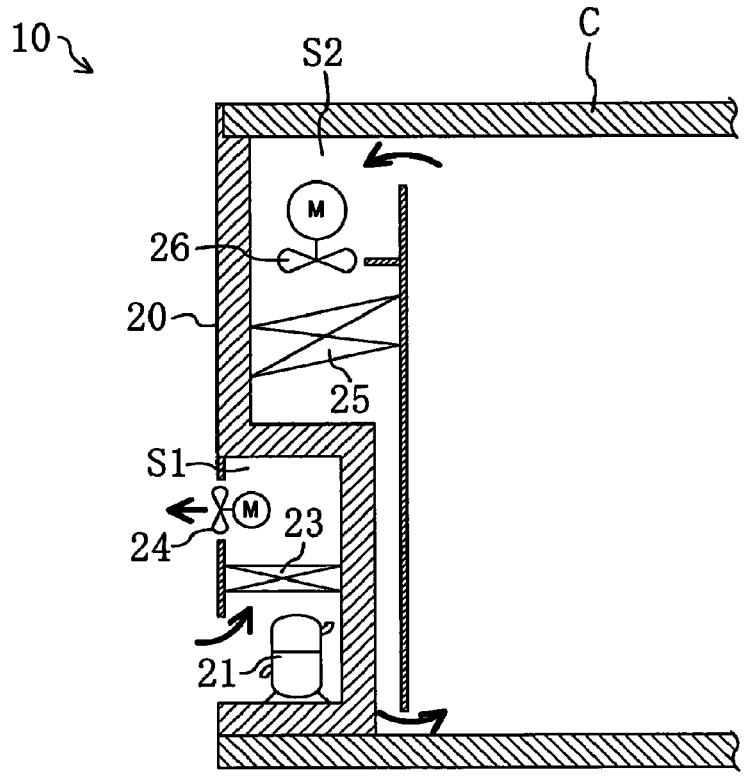
FIG. 2 is a longitudinal cross-sectional view of the container refrigeration system.

As shown in FIGS. 1 and 2, the container refrigeration system (10) includes a frame (20) assemblable to a front opening of the container (C) for storing goods.

As shown in FIG. 2, a lower part of the frame (20) is depressed towards the interior of the container (C). Furthermore, the frame (20) has an exterior storage space (S1) formed in the lower part to face the outside and has an interior storage space (S2) formed in the upper part to face the container interior.

The exterior storage space (S1) constitutes an outside air passage through which outside air flows. Placed in the exterior storage space (S1) are a compressor (21), a power cable (22), a condenser (23) and an external fan (24). The compressor (21) is constituted by a fixed displacement scroll compressor. The condenser (23) is constituted by a so-called air-cooled condenser for providing heat exchange between outside air fed by the external fan (24) and the refrigerant.

The interior storage space (S2) constitutes an inside air passage through which inside air flows. Placed in the interior storage space (S2) are an evaporator (25) and an internal fan (26). The evaporator (25) provides heat exchange between inside air fed by the internal fan (26) and the refrigerant.

The compressor (21), the condenser (23), the evaporator (25) and an unshown expansion valve are connected to each other by refrigerant pipes. As a result, in this container refrigeration system (10), a refrigerant circuit operating in a vapor compression refrigeration cycle is constituted.

Furthermore, the frame (20) includes a sight glass (27) and ventilators (28) all of which are formed in an upper part of the front face. The ventilators (28) constitute ventilating equipment for ventilating the container interior. The frame (20) also includes an electrical component box (30) according to the invention and mounted in the front face adjoining the external fan (24).

<Structure of Electrical Component Box>

The electrical component box (30) has a box body (31) formed in the shape of a box having an opening in the front and made from a resin material. The box body (31) is supported to the frame (20) so that its opening faces sideways (frontward).

Figure 3:
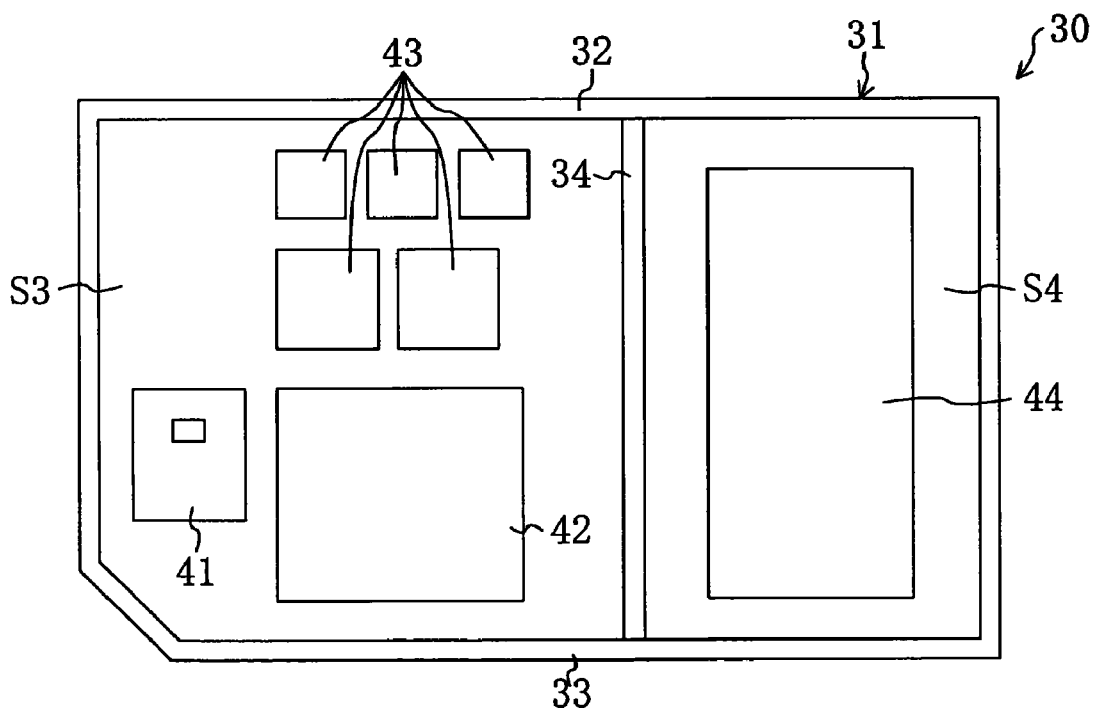
FIG. 3 is a schematic block diagram showing the interior of an electrical component box.

As shown in FIG. 3, the box body (31) has a top plate (32) formed at the top and a bottom plate (33) formed at the bottom. The box body (31) also has a partition plate (34) formed inside to extend vertically from the top plate (32) to the bottom plate (33). The partition plate (34) divides the interior of the box body (31) right and left into two spaces. The space on the left side of the partition plate (34) constitutes a heavy electrical component storage space (S3) in which various heavy electrical components are disposed. Disposed in the heavy electrical component storage space (S3) are a breaker (41), a transformer (42) and a plurality of magnet switches (43, 43, . . . ). On the other hand, the space on the right side of the partition plate (34) constitutes a light electrical component storage space (S4) in which various light electrical components are disposed. Disposed in the light electrical component storage space (S4) are a plurality of control boards (44, 44, . . . ) constituting a control circuit of the container refrigeration system.

Figure 4:
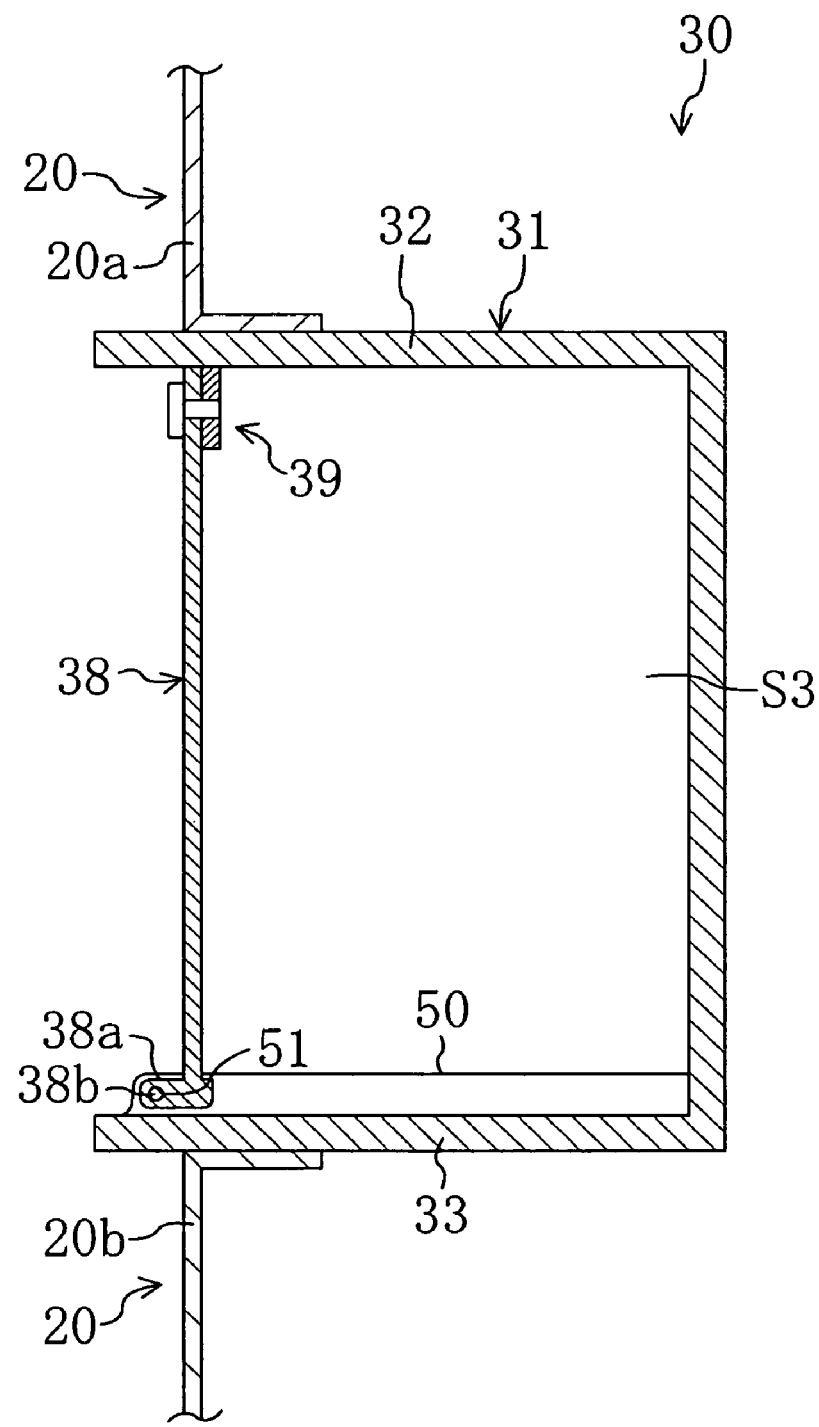
FIG. 4 is a longitudinal cross-sectional view of the electrical component box.

As shown in FIG. 4, the box body (31) is supported by an upper support plate (20a) and a lower support plate (20b) of the frame (20). The upper support plate (20a) is formed to bend along the top face of the top plate (32) of the box body (31). The upper support plate (20a) is fixed to the top plate (32) by fastener elements or other appropriate means. The lower support plate (20b) is formed to bend along the bottom face of the bottom plate (33) of the box body (31). The lower support plate (20b) is fixed to the bottom plate (33) by fastener elements or other appropriate means.

Figure 5:
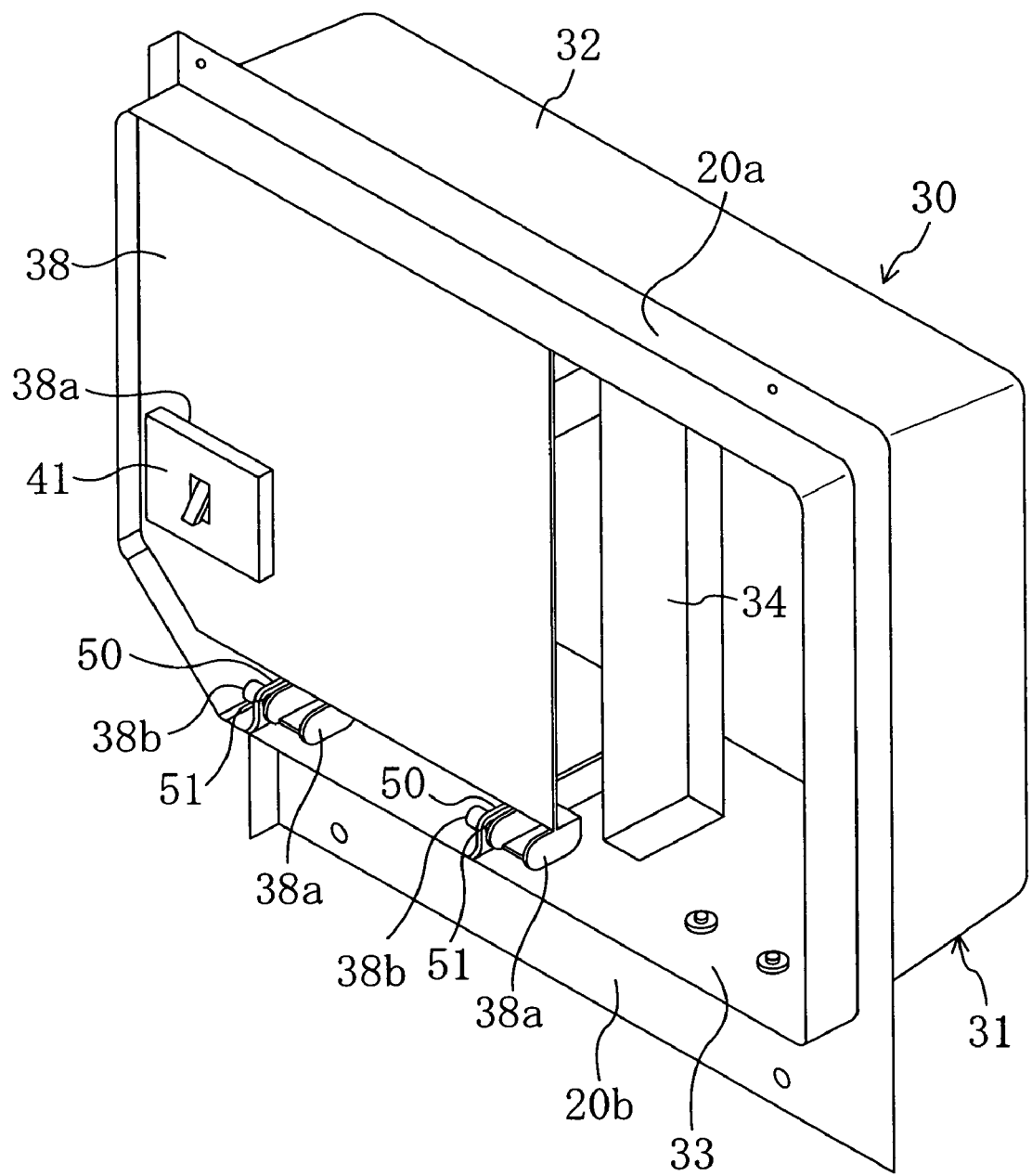
FIG. 5 is a schematic perspective view of the electrical component box as viewed from the front, wherein the safety cover is fitted thereto.
Figure 6:
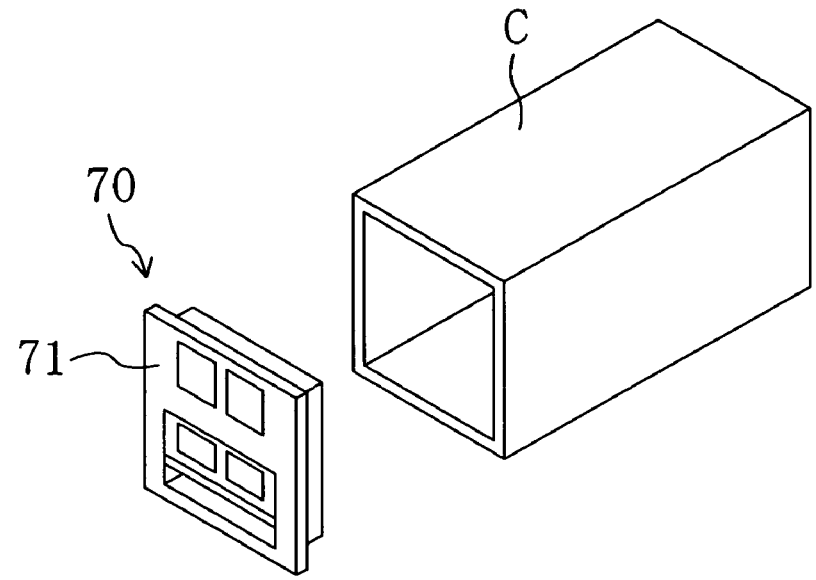
FIG. 6 is a schematic perspective view of a conventional container refrigeration system.
Figure 7:
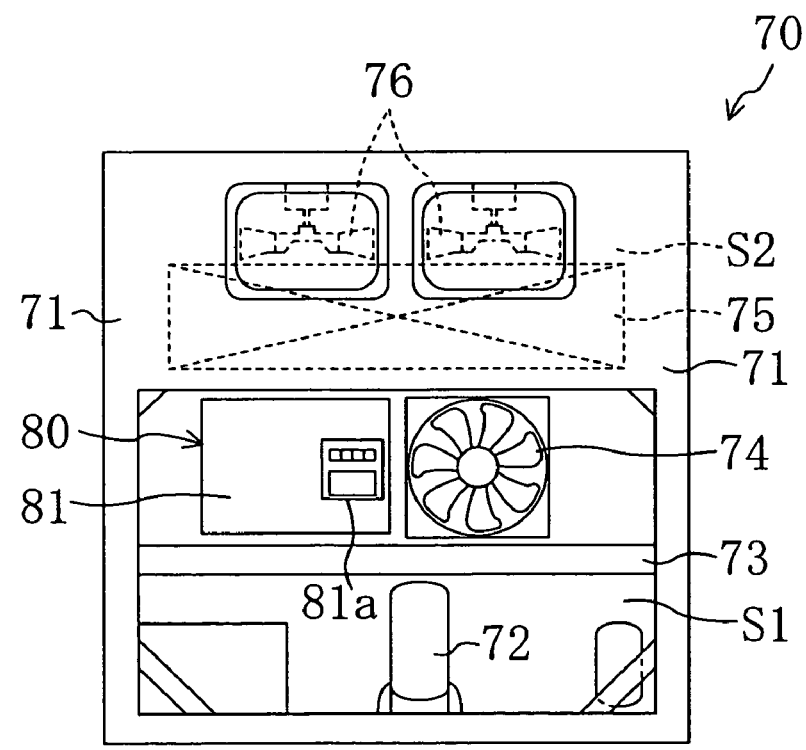
FIG. 7 is a schematic perspective view of the conventional container refrigeration system as viewed from the front.

As shown in FIG. 5, a pair of reinforcing ribs (50, 50) for increasing the strength of the box body (31) are integrally formed on the bottom plate (33) of the box body (31). These reinforcing ribs (50, 50) are provided in the heavy electrical component storage space (S3) and each formed in the shape of a plate extending from back to front of the box body (31). The reinforcing ribs (50, 50) have their respective pivot guides (50a, 50a) formed of round openings at their front ends.

The electrical component box (30) includes a safety cover (38) for opening and closing the opening of the box body (31). The safety cover (38) is provided only in the heavy electrical component storage space (S3) and constitutes a cover for safely shielding various heavy electrical components from the outside. The safety cover (38) has a pair of legs (38a, 38a) at its lower end. Furthermore, the legs (38a, 38a) have their respective pins (38b, 38b) provided at their lateral faces.

In the box body (31), the pins (38b, 38b) are pivotally fitted in the associated pivot guides (50a, 50a) of the reinforcing ribs (50, 50). In other words, the pivot guides (50a, 50b) constitute holders for pivotally holding the safety cover (38). Therefore, each reinforcing rib (50, 50) constitutes a member for reinforcing the bottom plate (33) of the box body (31) and also constitutes a member for holding the safety cover (38).

The upper end of the safety cover (38) is fastened to a fastening part (39) provided under the top plate (32) of the box body (31). As a result, the heavy electrical components of various kinds in the box body (31) are fully covered with the safety cover (38) so that the user cannot touch them. The safety cover (38) has a breaker opening (38a) formed for the purpose of exposing the breaker (41) to the outside. Thus, even with the opening of the box body (31) covered with the safety cover (38), the user can operate the switch of the breaker (41).

The electrical component box (30) also includes an outside lid (29) detachably attached thereto to further cover the opening of the box body (31) from the outside of the safety cover (38) (see FIG. 2). The outside lid (29) is provided with an operating part (29a) through which the user conducts operation mode change and other controls of the container refrigeration system (10).

—Operational Behavior—

A description is given of the operational behavior of the container refrigeration system (10) according to this embodiment. First, in order to start up the container refrigeration system (10), the user removes the outside lid (29) from the opening of the electrical component box (30). Then, in a state of the electrical component box (30) shown in FIG. 5, the switch of the breaker (41) exposed to the outside is turned on. As a result, the container refrigeration system (10) is energized. Thereafter, the user fits the outside lid (29) into the opening of the electrical component box (30) again and operates the operating part (29a) to start the operation of the container refrigeration system (10).

As shown in FIG. 2, during operation of the container refrigeration system (10), the compressor (21), the external fan (24) and the internal fan (26) are driven. In the refrigerant circuit of the container refrigeration system (10), refrigerant discharged from the compressor (21) flows through the condenser (23). In the condenser (23), the refrigerant exchanges heat with outside air fed by the external fan (24). As a result, the refrigerant releases heat to the outside air to condense. The refrigerant having condensed in the condenser (23) is reduced in pressure by the expansion valve and then flows through the evaporator (25). In the evaporator (25), the refrigerant exchanges heat with inside air fed by the internal fan (26). As a result, the refrigerant takes heat from the inside air to evaporate, whereby the inside air is cooled to a predetermined temperature. The refrigerant having evaporated in the evaporator (25) is sucked into the compressor (21) and compressed again therein.

—Maintenance of Electrical Component Box—

In doing maintenance or other services on the electrical components in the electrical component box (30) of the container refrigeration system (10) as described above, the following operations are done.

First, in doing maintenance on any one of the light electrical components in the electrical component box (30), only the outside lid (29) is removed from the box body (31). Thereafter, the user turns off the breaker (41) exposed on the safety cover (38) and then makes an exchange of or repairs to the light electrical component.

On the other hand, in doing maintenance on any one of the heavy electrical components in the electrical component box (30), the breaker (41) is turned off with the outside lid (29) removed from the box body (31) and, then, the safety cover (38) is opened. In opening the safety cover (38), the upper end of the safety cover (38) is first released from the fastening to the fastening part (39) and the safety cover (38) is then turned frontward. As a result, the interior of the safety cover (38) is opened to the outside, so that the heavy electrical components are exposed to the user. In this state, the user makes an exchange of or repairs to the target heavy electrical component.

EFFECTS OF EMBODIMENT

According to this embodiment, since the pair of reinforcing ribs (50, 50) are formed on the bottom plate (33) of the box body (31), the bottom plate (33) can be reinforced. This surely prevents the box body (31) from being broken and reduces the thickness of the box body (31) and in turn reduces the weight of the box body (31). Therefore, the box body (31) can be reduced in cost and, in turn, the frame (20) supporting the box body (31) can be simplified.

Furthermore, in this embodiment, the reinforcing ribs (50, 50) have their respective pivot guides (50a, 50a) to allow the safety cover (38) to turn about the pivot guides (50a, 50a). Therefore, the user can easily open and close the box body (31). Furthermore, according to this embodiment, since the box body (31) is made from a resin material, the box body (31) can be further reduced in weight. Since the reinforcing ribs (50) are integrally formed on the bottom plate (33) while the box body (31) is made from a resin material, the bottom plate (33) can be prevented from being broken. When the container refrigeration system (10) is used in sea transport, the box body (31) can be effectively prevented from being rusted by salt water. This ensures a good reliability of the box body (31).

Furthermore, in this embodiment, the reinforcing ribs (50) and the safety cover (38) are provided in the heavy electrical component storage space (S3). Therefore, the number of reinforcing ribs (50) can be reduced and the safety cover (38) can be saved in size. Although in respect of the bottom plate (33) of the box body (31) its part in the heavy electrical component storage space (S3) is put under a large load, the reinforcing ribs (50) formed on that part effectively prevent the box body (31) from being broken. Furthermore, since the heavy electrical components that would be dangerous especially in case of the user touching them are covered with the safety cover (38), the safety of the user can be sufficiently ensured.

Other Embodiments

The above embodiment may have the following configuration.

In addition to the reinforcing ribs (50) as in the above embodiment, one or more reinforcing ribs may be provided in the box body (31) to reinforce the box body (31).

The above embodiments are merely preferred embodiments in nature and are not intended to limit the scope, applications and use of the invention.

INDUSTRIAL APPLICABILITY

As can be seen from the above description, the present invention is useful for structures of electrical component boxes used in container refrigeration systems for cooling the interiors of containers.

The invention claimed is:

1. An electrical component box of a container refrigeration system for cooling the interior of the container, the electrical component box comprising:
   a box body formed in the shape of a box having an opening in one face and supported, with the opening oriented sideways, to a frame of the container refrigeration system; and
   a safety cover for opening and closing the opening of the box body, the box body having a reinforcing rib integrally formed on the top face of the bottom plate thereof, the reinforcing rib having a holder formed to hold the safety cover, wherein
   the interior of the box body is divided into a heavy electrical component storage space for storing heavy electrical components and an light electrical component storage space for storing light electrical components, and the reinforcing rib and the safety cover are provided in the heavy electrical component storage space.

2. The electrical component box of the container refrigeration system of claim 1, the reinforcement rib is formed in a central region of the top face.

3. The electrical component box of the container refrigeration system of claim 1, wherein the box body is made from a resin material.

4. The electrical component box of the container refrigeration system of claim 3, the reinforcement rib is formed in a central region of the top face.

5. The electrical component box of the container refrigeration system of claim 1,
wherein a pair of said reinforcing ribs are formed in parallel to each other on the bottom plate of the box body, and
the holder comprises a pivot guide pivotally supporting the safety cover.

6. The electrical component box of the container refrigeration system of claim 1, wherein
the box body is supported to a frame of the container refrigeration system from a lower side of the box body,
a pair of reinforcing ribs extends in a direction from a back of the box body toward an outside so that the pair of the reinforcing ribs are in parallel to each other, and
the holder pivotally supports the safety cover between the pair of the reinforcing ribs.

7. The electrical component box of the container refrigeration system of claim 1, the reinforcement rib is formed in a central region of the top face.

8. An electrical component box of a container refrigeration system for cooling the interior of the container, the electrical component box comprising:
a box body formed in the shape of a box having an opening in one face and supported, with the opening oriented sideways, to a frame of the container refrigeration system; and
a safety cover for opening and closing the opening of the box body, the box body having a reinforcing rib integrally formed on the top face of the bottom plate thereof, the reinforcing rib having a holder formed to hold the safety cover, wherein
the box body is supported to a frame of the container refrigeration system from a lower side of the box body,
a pair of reinforcing ribs extends in a direction from a back of the box body toward an outside so that the pair of the reinforcing ribs are in parallel to each other, and
the holder pivotally supports the safety cover between the pair of the reinforcing ribs.

9. The electrical component box of the container refrigeration system of claim 8, wherein the box body is made from a resin material.

10. The electrical component box of the container refrigeration system of claim 9, the reinforcement rib is formed in a central region of the top face.

11. The electrical component box of the container refrigeration system of claim 8, wherein
the interior of the box body is divided into a heavy electrical component storage space for storing heavy electrical components and an light electrical component storage space for storing light electrical components, and
the reinforcing rib and the safety cover are provided in the heavy electrical component storage space.

12. The electrical component box of the container refrigeration system of claim 11, the reinforcement rib is formed in a central region of the top face.

13. The electrical component box of the container refrigeration system of claim 8, wherein
the holder comprises a pivot guide pivotally supporting the safety cover.

14. The electrical component box of the container refrigeration system of claim 8, the reinforcement rib is formed in a central region of the top face.

* * * * *